United States Patent Office 2,948,739
Patented Aug. 9, 1960

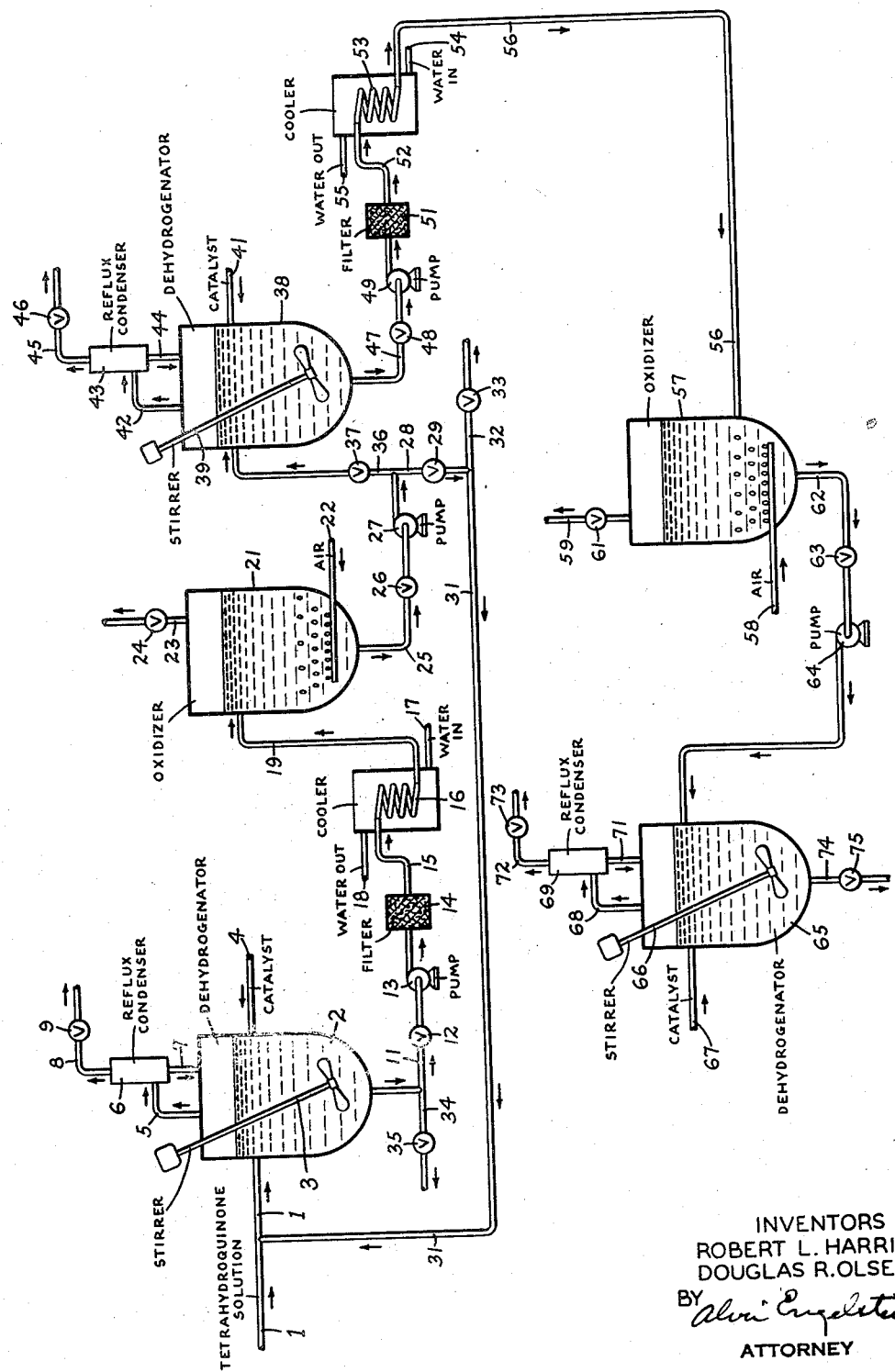

2,948,739

CONVERSION OF TETRAHYDROANTHRAQUINONE COMPOUND TO ANTRAQUINONE COMPOUND

Robert L. Harris, Morris Township, Morris County, and Douglas R. Olsen, Morristown, N.J., assignors to Allied Chemical Corporation, a corporation of New York Filed Jan. 9, 1957, Ser. No. 633,324

7 Claims. (Cl. 260—369)

This invention relates to the conversion of an alkylated tetrahydroanthraquinone to the corresponding alkylated anthraquinone and more particularly refers to a new and improved method of dehydrogenating a tetrahydroanthraquinone produced in the process for the production of hydrogen peroxide involving the reduction of an anthraquinone and oxidation of the resultant anthrahydroquinone.

The anthraquinone process for the production of hydrogen peroxide is described in the literature and commercially employed and consists of hydrogenating a quinone compound and oxidizing the hydroquinone compound thus formed back to the initial quinone compound. During hydrogenation, a side reaction leads to the addition of hydrogen to the aromatic nucleus of anthraquinone forming tetrahydroanthraquinone. The formation of tetrahydroanthraquinone compound materially reduces the rate of oxidation with resultant loss in capacity for production of hydrogen peroxide.

In A. E. Corey and R. L. Harris, U.S. Patent 2,739,042, issued March 20, 1956, is described a method for dehydrogenating the tetrahydroanthraquinone produced in the hydrogen peroxide process to the corresponding anthraquinone compound by heating the tetrahydroanthraquinone compound to a temperature in excess of 100° C. in the substantial absence of hydrogen and in the presence of a palladium or platinum dehydrogenation catalyst. The present application is particularly directed to improvements in the process of U.S. Patent 2,739,042.

Generally, the object of the present invention is to provide a more efficient method for converting the alkylated tetrahydroanthraquinone compound formed in the process of hydrogenating an alkylated anthraquinone compound for the production of hydrogen peroxide to the corresponding alkylated anthrahydroquinone. Other objects and advantages of the invention will be apparent from the following description and accompanying drawing.

In accordance with the present invention, a mixture of alkylated anthraquinone and alkylated tetrahydroanthraquinone resulting from nuclear hydrogenation during hydrogenation of alkylated anthraquinone in the process for the production of hydrogen peroxide is subjected to a plurality of dehydrogenation treatments, at least two and preferably not more than four, wherein in each dehydrogenation treatment the mixture of alkylated anthraquinone and alkylated tetrahydroanthraquinone is heated to a temperature in excess of 150° C., preferably within the range of 160–200° C., in the substantial absence of hydrogen; i.e. less than a few mol percent of hydrogen, and in the presence of a dehydrogenation catalyst selected from the group consisting of palladium and platinum, preferably palladium, to convert in each dehydrogenation stage a portion of the alkylated tetrahydroanthraquinone compound back to the alkylated anthraquinone compound and subjecting the mixture between dehydrogenation stages to an oxidation step by contacting the mixture with elemental oxygen, preferably by passing an oxygen-containing gas such as air in intimate contact with the mixture.

In the process for the production of hydrogen peroxide via an anthraquinone compound, the material circulated through the system is an anthraquinone compound in solution in a solvent medium, which solution is termed working solution. The anthraquinone compounds constituting about 10–20% of the working solution are known in the art and include anthraquinone and derivatives of anthraquinone such as methyl-, ethyl-, propyl-, butyl-, chloro- and bromoanthraquinones. The solvent medium constituting about 80–90% of the working solution is desirably a mixture of two or more constituents as described, for example, in co-pending U.S. application Serial No. 427,876, filed May 5, 1954, now Patent No. 2,890,105, and entitled "Solvent Medium for the Anthraquinone Process for the Production of Hydrogen Peroxide." Aromatic compounds such as benzene, toluene and xylene are examples of the solvent constituents suitable for maintaining the anthraquinone compound in solution. Alcohols having from about 5 to 12 carbon atoms in the molecule, as for example amyl alcohol, cyclohexanol, methyl cyclohexanol, dimethyl cyclohexanol, octyl alcohol, nonyl alcohol and decyl alcohol may be employed as the solvent constituent for maintaining the anthrahydroquinone compound in solution. A ketone such as acetophenone, a synergistic solvent, may be used as the third constituent of the solvent medium. Illustrative of the composition of the solvent medium would be 10–25% 2-ethylanthraquinone, 10–30% xylene, 10–35% octanol-2 and 25–60% acetophenone.

Working solution, an anthraquinone compound dissolved in organic solvents, is hydrogenated at a temperature of about 15–50° C. under substantially atmospheric pressure of 1–5 p.s.i.g. in the presence of a hydrogenation catalyst such as Raney nickel or palladium supported on a suitable medium, as for example, activated carbon or alumina, in an amount of approximately 0.01–10% catalyst by weight of the quinone present in the working solution, thereby reducing the anthraquinone compound to the hydroanthraquinone compound. After hydrogenation, catalyst is separated from the working solution, which latter is then oxidized by passing oxygen or oxygen-containing gas such as air in intimate contact with the working solution at room temperatures or higher, preferably about 30–35° C. Hydrogen peroxide is separated from the products of the oxidation reaction by scrubbing them with water. After extraction of hydrogen peroxide, the working solution is recycled for further reaction with hydrogen.

During the hydrogenation reaction, a side reaction leads to the addition of hydrogen to the aromatic nucleus of the anthraquinone compound, forming the tetrahydroanthraquinone compound, which latter being more stable than the corresponding anthraquinone compound accumulates in the working solution after many cycles of operation displacing the anthraquinone. Although the tetrahydroanthraquinone compound formed in the side reaction during the hydrogenation step may be used as a working compound in the hydrogen peroxide process, the oxidation of the tetrahydroanthrahydroquinone compound proceeds at a much slower rate than the corresponding anthrahydroquinone compound.

In Patent 2,739,042, issued March 20, 1956, is taught a method of reconverting tetrahydroanthraquinone compound to the corresponding anthraquinone compound by heating in the presence of a palladium or platinum catalyst in the substantial absence of hydrogen, i.e. a low concentration of hydrogen of the order of a few mol percent, at a temperature in excess of 100° C. We have found that as the dehydrogenation proceeds, not only does the rate of conversion fall off, but that there is a relatively abrupt decrease in the rate when the conversion is still relatively incomplete. The rate of decomposition of the tetrahydroanthraquinone may be increased and substantially complete decomposition effected by operating at higher temperatures, that is temperatures about 150° C., preferably within the range of 160–200° C., but we have found that under such conditions, degradation products are formed with loss of yield of the anthraquinone conversion product. We discovered that high degree of conversion and high yield of the anthraquinone may be obtained by carrying out the dehydrogenation in stages, with an oxidation step between the stages. This conversion method is particularly useful for the treatment of a composition with a relatively high proportion, i.e. more than 50%, of tetrahydroquinone compound to anthraquinone compound. We have been unable to determine with certainty the reason for degradation of some of the anthraquinone compound when operating at a high temperature in excess of 150° C. with a high degree of conversion in a single stage as compared to dehydrogenation in stages with an intermediate oxidation step. There appears to be some relation between high yield of conversion (dehydrogenation) of tetrahydroquinone and the simultaneous formation of hydroquinone reaction products, tetrahydrohydroquinone or anthrahydroquinone; and the function of the oxidation step in the stage dehydrogenation might be regarded as the oxidation of these hydroquinones to quinones to restore the conditions for high yield dehydrogenation conversion of tetrahydroquinone to anthrahydroquinone. Some degree of support for our theory may be found in our observation that during the dehydrogenation of the tetrahydroanthraquinone under high yield conditions, the hydrogen resulting from the dehydrogenation reaction does not leave the system as hydrogen gas but remains with the reaction products, forming hydroquinones by reacting with quinones.

Referring to the drawing, diagrammatically illustrating one method of carrying out the present invention, the tetrahydroquinone compound to be dehydrogenated to the corresponding anthraquinone compound may be introduced through line 1 into dehydrogenator 2 for first stage dehydrogenation treatment. The tetrahydroquinone feed may be all or a part of the working solution which has been subjected to repeated cyclic hydrogenation and oxidation treatments for the production of hydrogen peroxide with concomitant formation of tetrahydroanthraquinone as a by-product and may contain varying amount of tetrahydroanthraquinone ranging from about 5–80% tetrahydroanthraquinone compound relative to the total amount of anthraquinone compound in the working solution, dependent upon the number of times the working solution is recycled and the degree to which the tetrahydroanthraquinone is permitted to accumulate before being withdrawn from the hydrogen peroxide system. Other methods may be employed for obtaining a feed material of tetrahydroanthraquinone, such as separation of all or a portion of the tetrahydroanthraquinone from working solution by crystallization or by treatment with caustic soda. A solution of the tetrahydroanthraquinone may then be prepared by dissolving the crystals of tetrahydroanthraquinone in a solvent such as acetophenone.

Dehydrogenator 2 is equipped with a stirrer 3 for agitating the contents and provided with heating means, such as a steam jacket or a steam coil, not shown in the drawing. Catalyst is introduced into contact with the working solution through line 4. The dehydrogenation catalysts are palladium and platinum, preferably palladium, which catalysts are usually dispersed on solid supports such as activated carbon and alumina. The amount of catalyst required is approximately 1–10% by weight of the tetrahydroanthraquinone treated. The solution of tetrahydroquinone in dehydrogenator 2 is heated to a temperator in excess of 150° C., preferably within the range of 160–200° C., to obtain a high rate of conversion; to illustrate the rate of conversion, at 170° C. it is approximately twice as rapid as at 150° C. Vapors and gases evolved during the heating of the working solution in vessel 2 pass upwardly through line 5 into reflux condenser 6 wherein the vapors are condensed and returned through reflux line 7 to dehydrogenator 2. Uncondensed gases are released from the top of reflux condenser 6 through line 8 and valve 9. Superatmospheric pressure may be maintained on dehydrogenator 2 by controlling the opening of valve 9. To avoid degradation of the reaction products, particularly at high reaction temperatures, and to maintain a high rate of decomposition of the tetrahydroanthraquinone to the corresponding anthraquinone compound, it is desirable to limit the extent of conversion of tetrahydroanthraquinone to the anthraquinone in the first stage dehydrogenation treatment to less than 50% of the tetrahydroanthraquinone subjected to dehydrogenation in the first stage. The time required for first stage dehydrogenation may vary from about 15 minutes to 2 hours, dependent to some extent upon such factors as temperature, concentration of tetrahydroanthraquinone, degree of conversion and amount of catalyst.

The partially dehydrogenated solution of tetrahydroanthraquinone may be discharged from the bottom of dehydrogenator vessel 2 through line 11 and valve 12 and directed by pump 13 into centrifuge or filter 14 to effect separation of the catalyst which may be returned via line 4 to dehydrogenator 2 for conversion of another batch of tetrahydroanthraquinone. The clarified solution from filter 14 flows through line 15 and cooler 16 where it is cooled by indirect heat exchange to a temperature of below about 75° C. with cooling water entering through line 17 and discharging through line 18. The cooled solution is introduced through line 19 into oxidizer 21, which may be a vessel approximately the same size as dehydrogenator 2. Oxidation of the solution in oxidizer 21 is accomplished by bubbling oxygen or an oxygen-containing gas, preferably air, entering through line 22 through the solution in vessel 21. A catalyst is not necessary for the oxidation reaction. Uncondensed gases such as nitrogen and unreacted oxygen are released from the top of oxidizer 21 through line 23 and valve 24. If desired, solvent vapors carried by the uncondensed gases may be recovered by scrubbing or absorption in a conventional manner, not shown in the drawing. Oxidation of the solution is usually accomplished in a relatively short time of about 10–30 minutes. The oxidized solution is then discharged from the bottom of vessel 21 through line 25 and valve 26.

In one method of operation, the oxidized solution may be returned by means of pump 27 through line 28, valve 29, lines 31 and 1 to dehydrogenator 2 wherein it is subjected to second stage dehydrogenation in a manner similar to first stage dehydrogenation, except that the degree of conversion of tetrahydroanthraquinone to anthraquinone in the second stage dehydrogenation is desirably limited to less than 35% of the tetrahydroanthraquinone based on the total tetrahydroanthraquinone initially treated. The second stage dehydrogenated tetrahydroanthraquinone solution is separated from catalyst in filter 14, cooled in cooler 16 and oxidized in oxidizer 21 in a manner as previously described. The oxidized solution may be recirculated to dehydrogenator 2 to a third stage dehydrogenation and again, after oxidation, for a fourth stage dehydrogenation and again for a fifth stage dehydrogenation. The extent of dehydregnation of the tetrahydroanthraquinone in the third, fourth and fifth stages should desirably be less than 30, 25 and 20%, respectively, based on the tetrahydroanthraquinone initially present. To obtain the benefits of the present invention, there must be at least two dehydrogenation stages with one oxidation step between the stages. Although more than five dehydrogenation stages may be employed, we prefer to use no more than four dehydrogenation stages. The dehydrogneated product may be discharged through line 32 and valve 33 or after two or more dehydrogenation stages, may be discharged through line 34 and valve 35 and without separation of catalyst sent to the hydrogenator of the hydrogen peroxide system for production of hydrogen peroxide.

Second stage dehydrogenation may be accomplished by forcing the oxidized solution from the bottom of oxidizer 21 by means of pump 27 through line 36 and valve 37 into dehydrogenator 38, similar in construction to dehydrogenator 2 and equipped with stirrer 39 and provided with a heating jacket or steam coil. Catalyst for inducing dehydrogenation is introduced through line 41. Vapors evolved in the dehydrogenator 38 pass up through line 42 into reflux condenser 43 and the condensate is returned via reflux line 44 to vessel 38. Uncondensed gases are released from the top of reflux condenser 43 through line 45 and valve 46, which latter may also be employed to impose superatmospheric pressure on dehydrogenator 38. Dehydrogenation is effected in vessel 38 at a temperature in excess of 150° C., preferably within the range of 160–200° C. Desirably the dehydrogenation conditions are a little more drastic in the second stage than in the first stage, that is the temperature of dehydrogenation may be 5–20° higher in the second stage than in the first stage dehydrogenation. Up to 35% of the tetrahydroanthraquinone initially present may be converted to the corresponding anthraquinone in the second stage dehydrogenation.

The dehydrogenated solution from vessel 38 is withdrawn through line 47 and valve 48 and sent by pump 49 into filter 51 wherein the catalyst is separated and the clarified solution flows through line 52 into cooler 53 wherein it passes in indirect heat exchange with cooling water entering through line 54 and discharging through line 55 to be cooled to a temperature below about 75° C. The cooled, clarified solution is introduced through line 56 into oxidizer 57, similar in construction to oxidizer 21, wherein the solution is oxidized by blowing oxygen or oxygen-containing gas through line 58 up through the solution. Non-condensable gases are released from the top of chamber 57 through line 49 and valve 61. The oxidized solution in chamber 57 is withdrawn through line 62 and valve 63 and forced by pump 64 into dehydrogenator 65, similar in construction to dehydrogenators 2 and 38, and equipped with stirrer 66 and heating means, not shown in the drawing. Catalyst is introduced into the chamber through line 67. The solution is heated to a temperature above 150° C., preferably within the range of 160–200° C. The third dehydrogenation in vessel 65 may be conducted under the same or different conditions than in the first and second stages. Desirably the dehydrogenation conditions in the third stage are a little more drastic than in the second stage. Up to 30% of the tetrahydroanthraquinone initially present may be converted to the corresponding anthraquinone in the third stage dehydrogenation. Vapors released from the top of dehydrogenator 65 pass upwardly through line 68 into reflux condenser 69 wherein they are condensed and the condensate returned via reflux leg 71 to chamber 65. Uncondensed gases are released from the top of reflux condenser 69 through line 72 and valve 73, which latter may also be employed to maintain superatmospheric pressure on chamber 65. The dehydrogenated solution may be withdrawn from the bottom of vessel 65 through line 74 and valve 75 and subjected to additional oxidation and dehydrogenation stages or it may be directed to the hydrogen peroxide process for production of hydrogen peroxide.

The following example illustrates the present invention:

A 33% solution of 85:15 tetrahydroethylanthraquinone-ethylanthraquinone in acetophenone was prepared and to this solution was added 3.8% palladium catalyst dispersed on activated carbon support (1 part palladium:20 parts support). The mixture was heated to 180° C. and maintained at that temperature for 30 minutes. The solution was then filtered from the catalyst, cooled to a temperature of 40° C. and a current of air bubbled up through the solution for 15 minutes. The solution was then analyzed and it was found that the 85:15 tetrahydroethylanthraquinone - ethylanthraqinone was reduced to 70:30 tetrahydroethylanthraquinone-ethylanthraquinone. The oxidized solution was then subjected to a second stage dehydrogenation under conditions the same as the first stage at a temperature of 180° C. for 30 minutes. The solution was filtered from the catalyst, cooled and oxidized with a current of air. The ratio of tetrahydroethylanthraquinone to ethylanthraquinone was reduced to 56:44. A third stage dehydrogenation was carried out in the same manner as the first and second stages, except that the time was extended to 78 minutes. The resultant reaction product was filtered from the catalyst, cooled and treated with a current of air. The ratio of the tetrahydroethylanthraquinone to ethylanthraquinone was found to be 41:59. In the fourth stage, dehydrogenation was carried out at 180° C. in a manner the same as the previous stages, except that the time was extended to 102 minutes. The solution was filtered from the catalyst, cooled and treated with a current of air. The ratio of tetrahydroethylanthraquinone to ethylanthraquinone was found to be 34:66. In a fifth stage, dehydrogenation was carried out at 180° C. in the same manner as the fourth stage for 102 minutes. The solution was filtered from the catalyst, cooled and treated with a current of air. The ratio of tetrahydroethylanthraquinone to ethylanthraquinone was found to be 25:75. Analysis of the reaction products shows 100% recovery of the ethylanthraquinone and tetrahydroethylanthraquinone.

For comparative purposes, a 33% solution of 85:15 tetrahydroethylanthraquinone-ethylanthraquinone in acetophenone, together with palladium catalyst, the same as employed in the test above, was subjected to continuous heating for 5 hours at 180° C. The tetrahydroethylanthraquinone content was reduced as before to 25% of the initial total tetrahydroethylanthraquinone plus ethylanthraquinone but there was a loss of 25% in total tetrahydroethylanthraquinone plus ethylanthraquinone.

Although certain preferred embodiments of the invention have been disclosed for purpose of illustration, it will be evident that various changes and modifications may be made therein without departing from the scope and spirit of the invention.

We claim:

1. A process for the treatment of a mixture of alkylated anthraquinone and alkylated tetrahydroanthraquinone resulting from nuclear hydrogenation during hydrogenation of alkylated anthraquinone in the process for the production of hydrogen peroxide which comprises heating in a first stage the mixture to a temperature in excess of 150° C. in the substantial absence of hydrogen and in the presence of a dehydrogenation catalyst selected from the group consisting of palladium and platinum to effect conversion of up to 50% of the tetrahydroanthraquinone to the corresponding anthraquinone, subjecting the partially dehydrogenated mixture to oxidation with elemental oxygen, and subjecting the reaction product from oxidation to a second stage dehydrogenation at a temperature in excess of 150° C. in the substantial absence of hydrogen, i.e. less than a few mol percent of hydrogen and in the presence of a dehydrogenation catalyst selected from the group consisting of palladium and platinum to effect further dehydrogenation of the tetrahydroanthraquinone.

2. A process for the treatment of a mixture of alkylated anthraquinone and alkylated tetrahydroanthraquinone resulting from nuclear hydrogenation during hydrogenation of alkylated anthraquinone in the process for the production of hydrogen peroxide which comprises heating in a first stage the mixture to a temperature within the range of 160-200° C. in the substantial absence of hydrogen and in the presence of a palladium catalyst to effect conversion of up to 50% of the tetrahydroanthraquinone to the corresponding anthraquinone; subjecting the partially dehydrogenated mixture to oxidation with elemental oxygen, and subjecting the reaction product from oxidation to a second stage dehydrogenation at a temperature within the range of 160-200° C. in the substantial absence of hydrogen, i.e. less than a few mol percent of hydrogen and in the presence of a palladium catalyst to effect further dehydrogenation of the tetrahydroanthraquinone.

3. A process for treatment of a mixture of alkylated anthraquinone and alkylated tetrahydroanthraquinone resulting from nuclear hydrogenation during hydrogenation of alkylated anthraquinone in the process for the production of hydrogen peroxide which comprises heating a solution of the mixture of alkylated anthraquinone and alkylated tetrahydroanthraquinone to a temperature in excess of 150° C. in the substantial absence of hydrogen and in the presence of a palladium catalyst for a sufficient length of time to effect conversion of up to 50% of the tetrahydroanthraquinone to the corresponding anthraquinone, separating catalyst from the partially dehydrogenated solution, oxidizing the partially dehydrogenated solution by passing an oxygen-containing gas in contact with the solution, and subjecting the oxidized solution to second stage dehydrogenation at a temperature in excess of 150° C. in the substantial absence of hydrogen, i.e. less than a few mol percent of hydrogen and in the presence of a palladium catalyst to effect conversion of up to 35% of the tetrahydroanthraquinone based on the tetrahydroanthraquinone initially present to the corresponding anthraquinone.

4. A process for the treatment of a mixture of alkylated anthraquinone and alkylated tetrahydroanthraquinone resulting from nuclear hydrogenation during hydrogenation of alkylated anthraquinone in the process for the production of hydrogen peroxide which comprises subjecting the mixture containing the alkylated tetrahydroanthraquinone compound to a plurality of dehydrogenation treatments wherein in each dehydrogenation treatment the alkylated tetrahydroanthraquinone compound is heated to a temperature in excess of 150° C. in the substantial absence of hydrogen and in the presence of a palladium catalyst to convert in each dehydrogenation treatment a portion of the alkylated tetrahydroanthraquinone compound to the corresponding alkylated anthraquinone compound and subjecting the reaction products between dehydrogenation treatments to oxidation by contact with elemental oxygen wherein in the first dehydrogenation treatment conversion of up to 50% of the tetrahydroanthraquinone to the corresponding anthraquinone is effected.

5. A process as claimed in claim 4 wherein there are three dehydrogenation treatments and wherein in the first dehydrogenation treatment up to 50% of the tetrahydroanthraquinone compound is converted to the corresponding anthraquinone compound; in the second dehydrogenation treatment up to 35% of the tetrahydroanthraquinone compound is converted to the corresponding anthraquinone compound; and in a third dehydrogenation treatment up to 30% of the tetrahydroanthraquinone compound is converted to the corresponding anthraquinone compound.

6. A process as claimed in claim 4 wherein there are four dehydrogenation treatments and wherein in the first dehydrogenation treatment up to 50% of the tetrahydroanthraquinone compound is converted to the corresponding anthraquinone compound; in the second dehydrogenation treatment up to 35% of the tetrahydroanthraquinone compound is converted to the corresponding anthraquinone compound; in the third dehydrogenation treatment up to 30% of the tetrahydroanthraquinone compound is converted to the corresponding anthraquinone compound; and in the fourth dehydrogenation treatment up to 25% of the tetrahydroanthraquinone compound is converted to the corresponding anthraquinone compound.

7. A process as claimed in claim 4 wherein there are five dehydrogenation treatments and wherein in the first dehydrogenation treatment up to 50% of the tetrahydroanthraquinone compound is converted to the corresponding anthraquinone compound; in the second dehydrogenation treatment up to 35% of the tetrahydroanthraquinone compound is converted to the corresponding anthraquinone compound; in the third dehydrogenation treatment up ot 30% of the tetrahydroanthraquinone compound is converted to the corresponding anthraquinone compound; in the fourth dehydrogenation treatment up to 25% of the tetrahydroanthraquinone compound is converted to the corresponding anthraquinone compound; and in the fifth dehydrogenation treatment up to 20% of the tetrahydroanthraquine compound is converted to the corresponding anthraquinone compound.

References Cited in the file of this patent

UNITED STATES PATENTS 2,739,042    Corey et al.             Mar. 20, 1956

FOREIGN PATENTS 741,499    Great Britain            Dec. 7, 1955